United States Patent
Kozono et al.

(10) Patent No.: US 12,165,642 B2
(45) Date of Patent: *Dec. 10, 2024

(54) VEHICLE-MOUNTED DEVICE OPERATION SYSTEM

(71) Applicant: TOYOTA JIDOSHA KABUSHIKI KAISHA, Toyota (JP)

(72) Inventors: Yuki Kozono, Toyota (JP); Shu Nakajima, Toyota (JP); Takeshi Nawata, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

This patent is subject to a terminal disclaimer.

(21) Appl. No.: 17/839,167

(22) Filed: Jun. 13, 2022

(65) Prior Publication Data

US 2022/0310093 A1  Sep. 29, 2022

Related U.S. Application Data

(63) Continuation of application No. 16/700,178, filed on Dec. 2, 2019, now Pat. No. 11,393,469.

(30) Foreign Application Priority Data

Dec. 19, 2018  (JP) ................................. 2018-237467

(51) Int. Cl.
*G10L 15/22* (2006.01)
*B60K 35/00* (2006.01)
(Continued)

(52) U.S. Cl.
CPC .............. *G10L 15/22* (2013.01); *B60K 35/00* (2013.01); *B60K 35/10* (2024.01); *G06F 3/14* (2013.01);
(Continued)

(58) Field of Classification Search
None
See application file for complete search history.

(56) References Cited

U.S. PATENT DOCUMENTS 6,240,347 B1 * 5/2001 Everhart ................ B60K 35/00
  701/1
2003/0018474 A1 * 1/2003 Chavan ................... G10L 15/26
  704/E15.045

(Continued)

FOREIGN PATENT DOCUMENTS

EP     1 769 963 A2     4/2007
JP     2000163091 A  *  6/2000
(Continued)

*Primary Examiner* — William C Trapanese
(74) *Attorney, Agent, or Firm* — Oblon, McClelland, Maier & Neustadt, L.L.P.

(57) ABSTRACT

A vehicle-mounted device operation system, includes: an operating part that is located in a vehicle cabin, and configured to be subjected to operation for manually operating a vehicle-mounted device; a sound collector that is located in the vehicle cabin, and configured to collect speech of an occupant; and a processor configured to determine whether a command to the vehicle-mounted device is included in a content of the speech of the occupant collected by the sound collector, activate the vehicle-mounted device according to the command, when the processor determines that the command to the vehicle-mounted device is included in the content of the speech of the occupant, and highlight the operating part for the vehicle-mounted device activated by the processor.

17 Claims, 13 Drawing Sheets

(51) Int. Cl.
  *B60K 35/10* (2024.01)
  *G06F 3/14* (2006.01)
  *B60K 35/23* (2024.01)
  *B60R 16/037* (2006.01)

(52) U.S. Cl.
  CPC ........ *B60K 35/23* (2024.01); *B60K 2360/148* (2024.01); *B60K 2360/349* (2024.01); *B60R 16/0373* (2013.01); *G10L 2015/223* (2013.01)

(56) References Cited

U.S. PATENT DOCUMENTS

| | | | |
|---|---|---|---|
| 2006/0155547 A1* | 7/2006 | Browne | G10L 15/26 704/E15.045 |
| 2007/0152800 A1* | 7/2007 | Seydoux | H04M 1/72469 340/426.2 |
| 2013/0038437 A1 | 2/2013 | Talati | |
| 2015/0060257 A1 | 3/2015 | Suzuki et al. | |
| 2016/0379631 A1* | 12/2016 | Wang | B60N 2/0232 704/275 |
| 2018/0074687 A1 | 3/2018 | Ho et al. | |
| 2018/0143635 A1* | 5/2018 | Zijderveld | A61B 5/165 |
| 2018/0159970 A1 | 6/2018 | Hiroki | |
| 2019/0303095 A1* | 10/2019 | Sohoni | G10L 15/22 |

FOREIGN PATENT DOCUMENTS

| | | |
|---|---|---|
| JP | 2012-190406 A | 10/2012 |
| JP | 2015-054564 A | 3/2015 |
| JP | 5898157 B2 | 4/2016 |
| JP | 2017-090613 A | 5/2017 |
| JP | 2017-090614 A | 5/2017 |
| JP | 3 047 933 A1 | 8/2017 |
| JP | 2018-90086 A | 6/2018 |
| WO | WO 2005/062296 A1 | 7/2005 |
| WO | WO 2009/020026 A1 | 11/2010 |

* cited by examiner

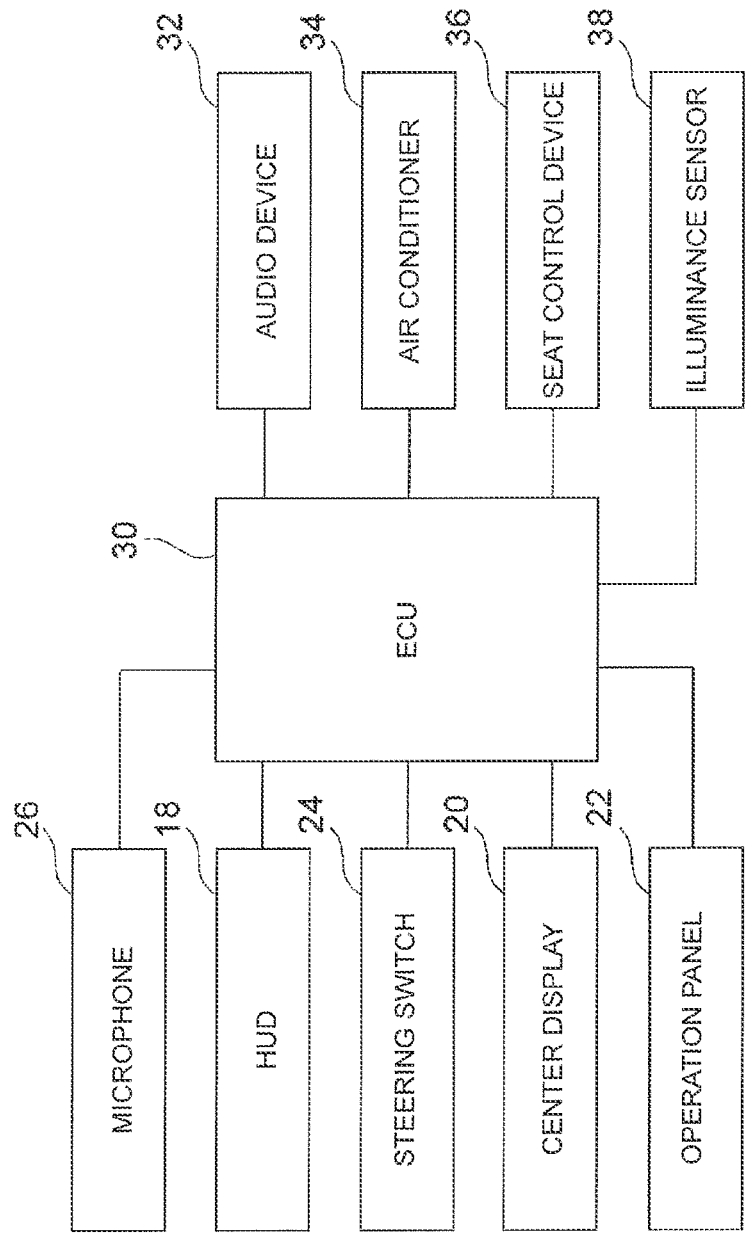

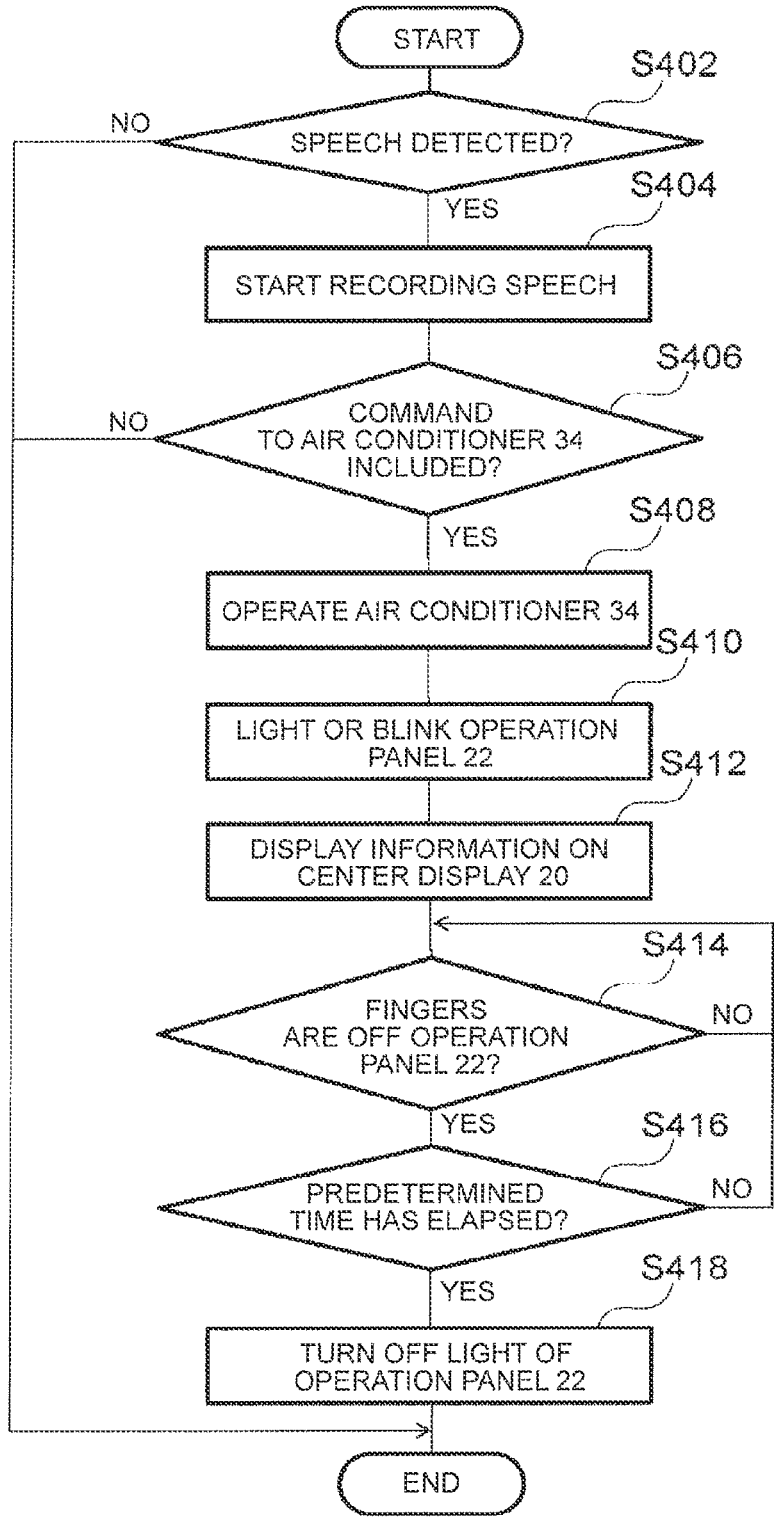

VEHICLE-MOUNTED DEVICE OPERATION SYSTEM

INCORPORATION BY REFERENCE

This application is a continuation of U.S. application Ser. No. 16/700,178, filed Dec. 2, 2019, the entire contents of which is incorporated herein by reference. U.S. application Ser. No. 16/700,178 claims the benefit of priority under 35 U.S.C. § 119 of Japanese Patent Application No. 2018-237467 filed on Dec. 19, 2018 including the specification, drawings and abstract which is incorporated herein by reference in its entirety.

BACKGROUND

1. Technical Field

The disclosure relates to a vehicle-mounted device operation system.

2. Description of Related Art

A speech recognition control system using both speech recognition and eye-gaze detection is disclosed in Japanese Unexamined Patent Application Publication No. 2017-90614 (JP 2017-90614 A). More specifically, the system has a speech recognizer that recognizes the utterance position at which a person speaks, and the content of utterance, and also has an eye-gaze detector that detects an object to be controlled, from the line of sight of the person located at the utterance position.

SUMMARY

When the speech recognition function is used as in the system of JP 2017-90614 A, an occupant of a vehicle needs to manually perform fine adjustment or tweaking, detail setting, etc. of a vehicle-mounted device. In this case, there is still some room for improvement in the manual operability of the vehicle-mounted device.

This disclosure provides a vehicle-mounted device operation system having a speech recognition function, which assures improved manual operability of a vehicle-mounted device.

A vehicle-mounted device operation system includes: an operating part that is located in a vehicle cabin, and configured to be subjected to operation for manually operating a vehicle-mounted device; a sound collector that is located in the vehicle cabin, and configured to collect speech of an occupant; and a processor configured to determine whether a command to the vehicle-mounted device is included in a content of the speech of the occupant collected by the sound collector, activate the vehicle-mounted device according to the command, when the processor determines that the command to the vehicle-mounted device is included in the content of the speech of the occupant, and highlight the operating part for the vehicle-mounted device activated by the processor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a block diagram showing the hardware configuration of the vehicle-mounted device operation system according to the first embodiment;

FIG. 14 is a flowchart illustrating one example of a vehicle-mounted device operating routine performed by the vehicle-mounted device operation system according to the second embodiment.

DETAILED DESCRIPTION OF EMBODIMENTS

First Embodiment

Figure 1:
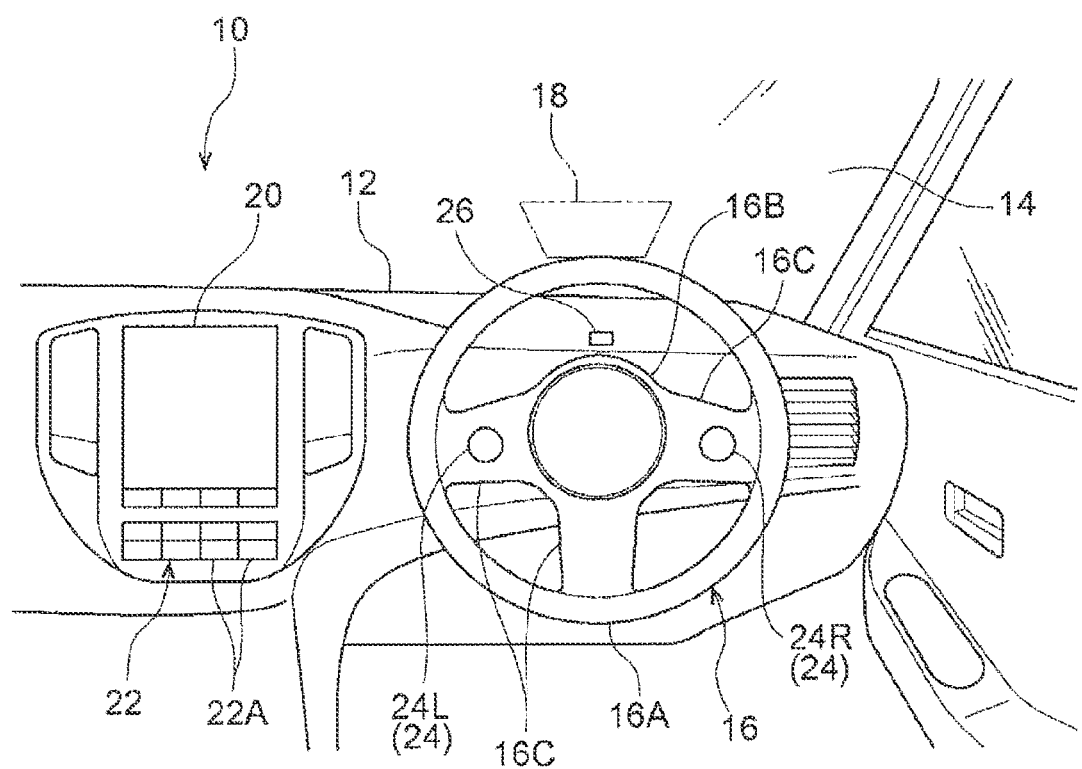
FIG. 1 is an appearance diagram illustrating a front part of a vehicle cabin of a vehicle using a vehicle-mounted device operation system according to a first embodiment, when viewed from the vehicle rear side.

A vehicle-mounted device operation system according to a first embodiment will be described with reference to the drawings. As shown in FIG. 1, an instrument panel 12 is installed in a front part of a vehicle cabin of a vehicle 10 using the vehicle-mounted device operation system of this embodiment. A windshield glass 14 is placed on a front end portion of the instrument panel 12, and the windshield glass 14 extends in the vehicle vertical direction and vehicle width direction, to delimit a boundary between the inside and outside of the vehicle cabin.

A head-up display 18 (which will be called "HUD 18" when appropriate) as a display is provided on the windshield glass 14. The HUD 18 is set in a region of the windshield glass 14 which is located on the vehicle front side of the driver seat. In operation, an image is projected from a projector (not shown) provided inside the instrument panel 12, toward the windshield glass 14, so that information is displayed on the HUD 18.

A steering wheel 16 is provided, via a steering column (not shown), at the driver seat side (vehicle right-hand side) of the instrument panel 12. The steering wheel 16 includes a rim 16A having a generally annular shape. The steering wheel 16 also includes a hub 16B that provides a central part of the wheel 16, and is located radially inward of the rim 16A. The rim 16A and the hub 16B are connected by two or more (three in this embodiment) spokes 16C.

The spokes 16C are provided at three locations, more specifically, between the right-hand side of the rim 16A and the hub 16B, between the left-hand side of the rim 16A and the hub 16B, and between the lower side of the rim 16A and the hub 16B. A right steering switch 24R as one example of operating part is provided on the spoke 16C located between the right-hand side of the rim 16A and the hub 16B. Also, a left steering switch 24L as one example of operating part is provided on the spoke 16C located between the left-hand side of the rim 16A and the hub 16B. The right steering switch 24R and the left steering switch 24L will be described later in detail. In the following description, the right steering switch 24R and left steering switch 24L will be simply called "steering switch 24", when they are not distinguished from each other.

A center display 20 as a display is provided on a central part of the instrument panel 12 as viewed in the vehicle width direction. Also, an operation panel 22 as one example of operating part is provided below the center display 20. The operation panel 22 includes a plurality of operation buttons 22A. An audio device 32 as one example of vehicle-mounted device and an air conditioner 34 as another example of vehicle-mounted device (see FIG. 6) are operated by pressing particular ones of the operation buttons 22A, for example. Also, information displayed on the center display 20 is changed, and a navigation system is operated, by pressing the operation buttons 22A, for example.

A microphone 26 as a sound collector is provided on the instrument panel 12, to be located on the vehicle front side of the driver seat. In this embodiment, the microphone 26 is arranged to collect speech of an occupant (in particular, the driver).

Hardware Configuration

As shown in FIG. 6, the vehicle-mounted device operation system includes an electronic control unit (ECU) 30 as a controller. The ECU 30 is electrically connected to the microphone 26, HUD 18, steering switches 24, center display 20, operation panel 22, audio device 32, air conditioner 34, seat control device 36, and illuminance sensor 38.

The audio device 32, when activated, reproduces music, etc., and delivers music, etc. from a speaker or speakers (not shown) provided in the vehicle cabin. The air conditioner 34, when activated, causes air having a temperature controlled to a given temperature, to blow out into the vehicle cabin.

The seat control device 36 controls a vehicle seat. More specifically, the seat control device 36 can change the position of the vehicle seat in the vehicle longitudinal direction, the height of the vehicle seat, the reclining angle of the vehicle seat, and so forth. Also, the seat control device 36 of this embodiment is arranged to give a massage to the back of the occupant, by expanding and contracting an air bag provided in a seat back of the vehicle seat. In this embodiment, the audio device 32, air conditioner 34, and seat control device 36 correspond to vehicle-mounted devices.

The illuminance sensor 38, which is provided in the vehicle cabin, for example, is arranged to measure the illuminance of the surroundings of the vehicle 10.

Figure 7:
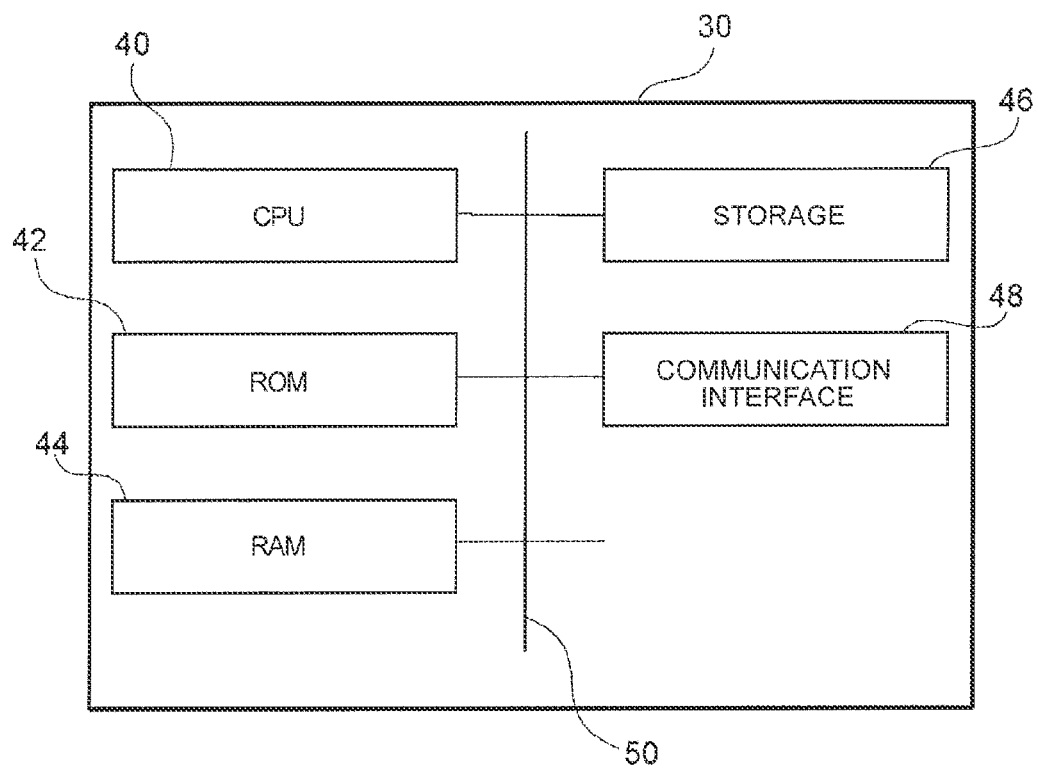
FIG. 7 is a block diagram showing the hardware configuration of an electronic control unit (ECU) that constitutes the vehicle-mounted device operation system according to the first embodiment.

FIG. 7 is a block diagram showing the hardware configuration of the ECU 30 that constitutes the vehicle-mounted device operation system. As shown in FIG. 7, the ECU 30 includes a central processing unit (CPU) (processor) 40, read-only memory (ROM) 42, random access memory (RAM) 44, storage 46, and communication interface 48. These components are connected via a bus 50 such that they can communicate with one another.

The CPU 40 executes various programs, and controls each part of the system. Namely, the CPU 40 reads a program from the ROM 42 or storage 46, and executes the program, using the RAM 44 as a workspace. The CPU 40 controls each of the above components and performs various computations, according to programs stored in the ROM 42 or storage 46.

The ROM 42 stores various programs and various data. The RAM 44 serving as a workspace temporarily stores a program or data. The storage 46 is in the form of a hard disk drive (HDD) or a solid state drive (SSD), and stores various programs including an operating system, and various data.

The communication interface 48 permits the ECU 30 to communicate with a server and other devices, and standards, such as Ethernet (registered trade name), Fiber Distributed Data Interface (FDDI), and Wi-Fi (registered trade name), are used for communications involving the communication interface 48.

Functional Configuration

The vehicle-mounted device operation system implements various functions, using the hardware resources shown in FIG. 6 and FIG. 7. The functional configuration provided by the vehicle-mounted device operation system will be described with reference to FIG. 8.

Figure 8:
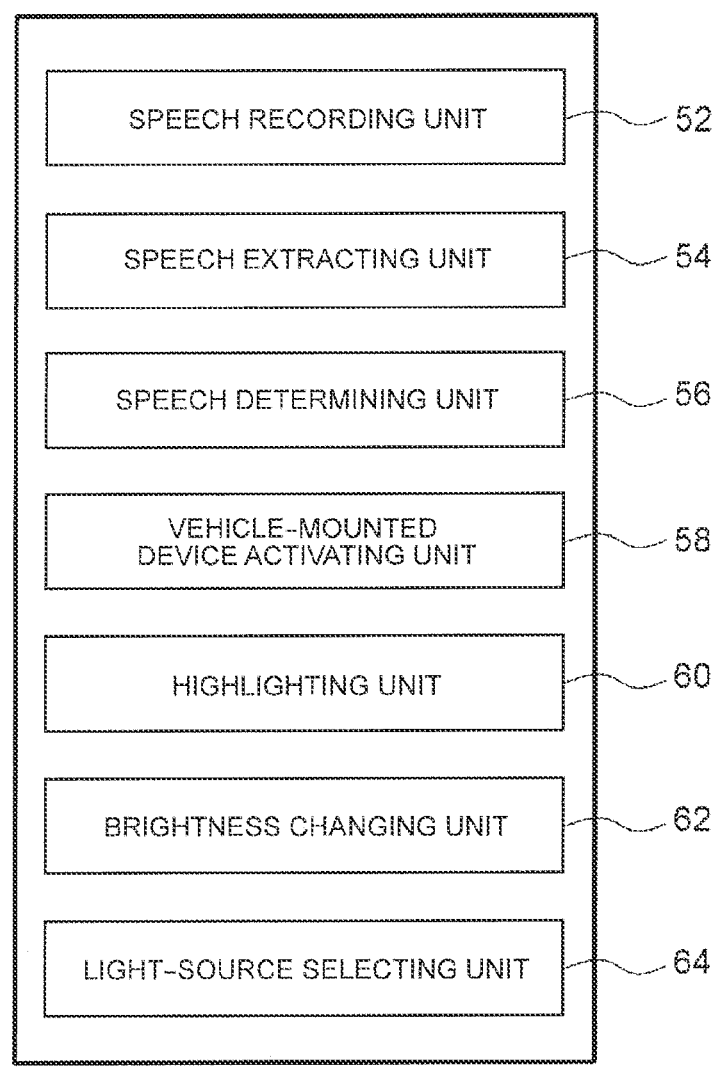
FIG. 8 is a block diagram showing an example of the functional configuration in the vehicle-mounted device operation system according to the first embodiment.

As shown in FIG. 8, the vehicle-mounted device operation system includes, as its functional components, a speech recording unit 52, speech extracting unit 54, speech determining unit 56, vehicle-mounted device activating unit 58, highlighting unit 60, brightness changing unit 62, and light-source selecting unit 64. To realize each of the functional components, the CPU 40 of the ECU 30 reads a program stored in the ROM 42 or storage 46, and executes the program.

The speech recording unit 52 records speech given by an occupant and collected with the microphone 26. The speech extracting unit 54 extracts a particular word or words from the speech recorded by the speech recording unit 52. The particular words mentioned herein are words concerning commands directed to the vehicle-mounted devices. In this embodiment, the speech extracting unit 54 extracts a word or words concerning a command to any one of the audio device 32, air conditioner 34, and seat control device 36. The speech extracting unit 54 may extract a particular word or words as a command to a certain vehicle-mounted device, even in the case where the words do not include the specific name of the vehicle-mounted device. For example, when the occupant utters words "It's hot", the words may be extracted as a command to the air conditioner 34.

The speech determining unit 56 determines whether a command to any vehicle-mounted device is included in the speech, based on the content of the speech of the occupant extracted by the speech extracting unit 54. More specifically, the speech determining unit 56 determines the vehicle-mounted device to be operated and the content of operation, from the content of the speech of the occupant.

The vehicle-mounted device activating unit 58 activates the vehicle-mounted device to be operated, according to the content of operation instructed by the occupant. For example, w % ben the occupant says "It's hot", the speech determining unit 56 determines that the vehicle-mounted device to be operated is the air conditioner 34. Then, the vehicle-mounted device activating unit 58 activates the air conditioner 34, so as to introduce cold air into the vehicle cabin. When cold air has already been introduced into the vehicle cabin by means of the air conditioner 34, the vehicle-mounted device activating unit 58 activates the air conditioner 34, so as to lower the temperature of the cold air introduced into the vehicle cabin, or increase the volume of the air.

Figure 2:
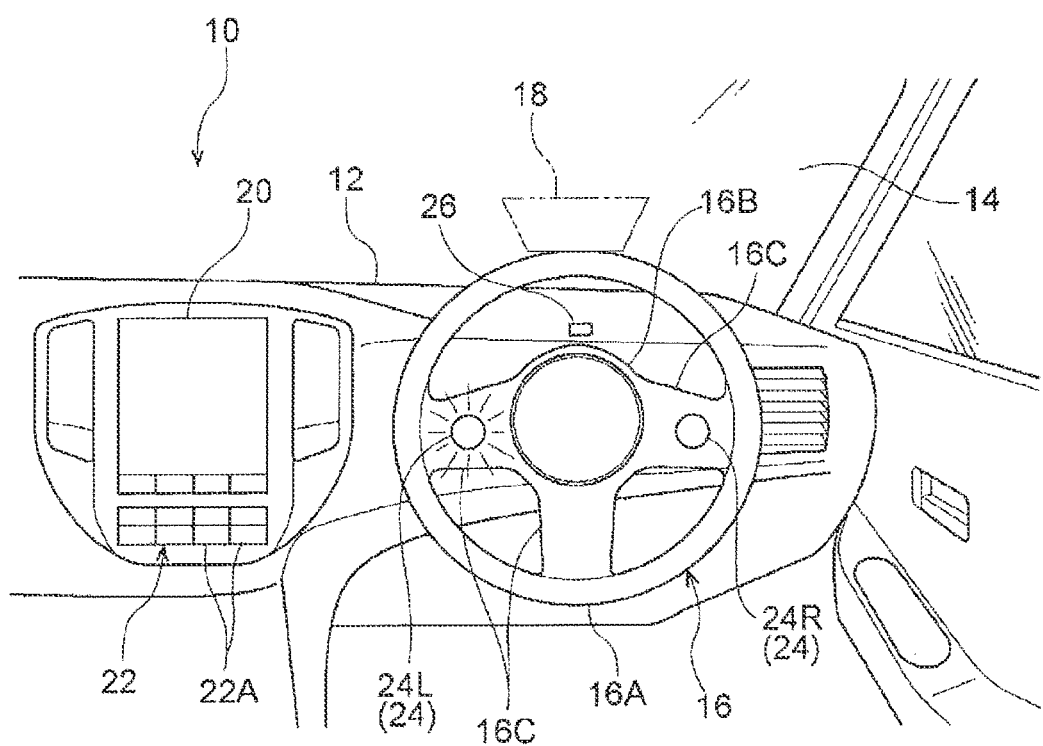
FIG. 2 is an appearance diagram corresponding to FIG. 1, illustrating a condition in which a steering switch is lighted, from the condition of FIG. 1.

The highlighting unit 60 highlights the operating part for the vehicle-mounted device activated by the vehicle-mounted device activating unit 58. As shown in FIG. 2, in this embodiment, the operating part for the air conditioner 34 is set to the left steering switch 24L, as one example; thus, highlighting is performed by lighting or blinking the left steering switch 24L.

As shown in FIG. 8, the brightness changing unit 62 changes the brightness when the highlighting unit 60 lights or blinks the operating part. More specifically, the brightness changing unit 62 changes the brightness according to the illuminance of the surroundings of the vehicle 10 measured by the illuminance sensor 38 (see FIG. 6). Namely, as the illuminance of the surroundings of the vehicle 10 measured by the illuminance sensor 38 is lower, the brightness at the time of lighting or blinking of the operating part is reduced. Conversely, as the illuminance of the surroundings of the vehicle 10 measured by the illuminance sensor 38 is higher, the brightness is changed to be increased.

The light-source selecting unit 64 selects a light source of illumination when the operating part is lighted or blinked. In this embodiment, two or more light sources are provided for lighting or blinking the right steering switch 24R and left steering switch 24L, and the respective light sources emit light beams having different colors. The light-source selecting unit 64 selects a light source with a color that is easy to be seen by the occupant, depending on the illuminance of the surroundings of the vehicle 10 measured by the illuminance sensor 38, so that the right steering switch 24R and the left steering switch 24L are lighted or blinked with light from the selected light source.

Description of Display Information

Figure 3A:
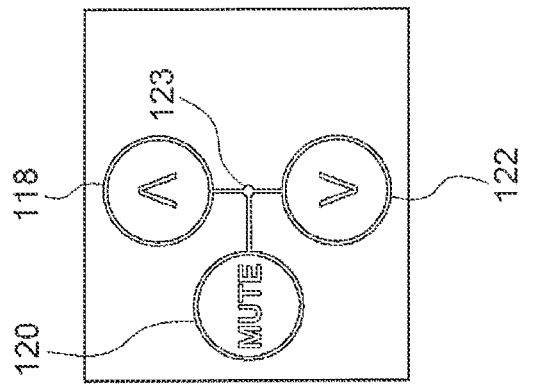
FIG. 3A is a front view of a first-tier screen as a display example of a head-up display in the first embodiment.

Here, display information displayed on the HUD 18 of this embodiment will be described. On the HUD 18 of this embodiment, information on the vehicle-mounted devices is displayed in a hierarchical way. FIG. 3A shows a first-tier menu screen (home screen). On the first-tier screen, four (upper, lower, left and right) icons are displayed.

An audio icon 102, which is concerned with the function of the audio device 32, is displayed on the upper part of the first-tier screen. An air-conditioner icon 104, which is concerned with the function of the air conditioner 34, is displayed on the left part of the first-tier screen.

A seat icon 106, which is concerned with the function of the seat control device 36, is displayed on the lower part of the first-tier screen. An icon 108 that is concerned with other functions is displayed on the right part of the first-tier screen.

In this connection, the steering switch 24 shown in FIG. 1 includes a capacitive sensor, and is adapted to detect a swipe action with the finger of the occupant. Also, the steering switch 24 is configured to be able to be pressed. In operation, any icon is selected through a swipe action, and then determined when the steering switch 24 is pressed.

Figure 3B:
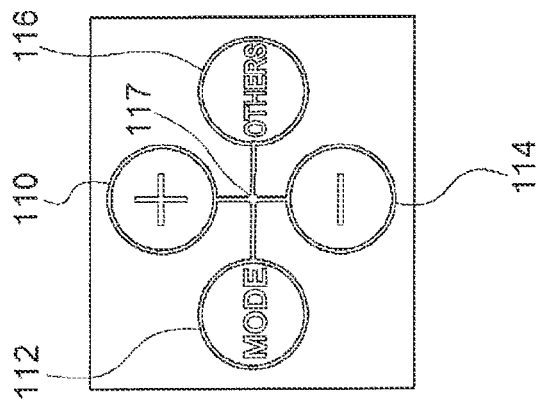
FIG. 3B is a front view of a second-tier screen as a display example of the head-up display in the first embodiment, which is displayed when operation of an audio device is determined on the first-tier screen.

FIG. 3B shows a second-tier menu screen. The second-tier screen is displayed when the left steering switch 24L is pressed in a condition where the icon 102 is selected through a swipe action over the left steering switch 24L. An icon 110 for selection of a sound source is displayed on the upper part of the second-tier screen, and this icon 110 is used for changing the sound source of the audio device 32. For example, the icon 110 is selected, so that the sound source is switched from music stored in a storage area of the audio device 32 to radio.

An icon 112 for switching of a playback mode is displayed on the left part of the second-tier screen, and this icon 112 is determined, so that the playback mode of music, for example, can be switched or changed.

An icon 114 for selection of the sound source is displayed on the lower part of the second-tier screen. Like the icon 110, the icon 114 is used for changing the sound source of the audio device 32. Also, the icon 114 is used for switching the sound source in reverse order, with respect to that of the icon 110.

An icon 116 concerned with other functions is displayed on the right part of the second-tier screen. Also, a screen central part 117 can be selected on the second-tier screen, and the screen returns to the first-tier menu screen when the left steering switch 24L is pressed in a condition where the screen central part 117 is selected.

Figure 3C:
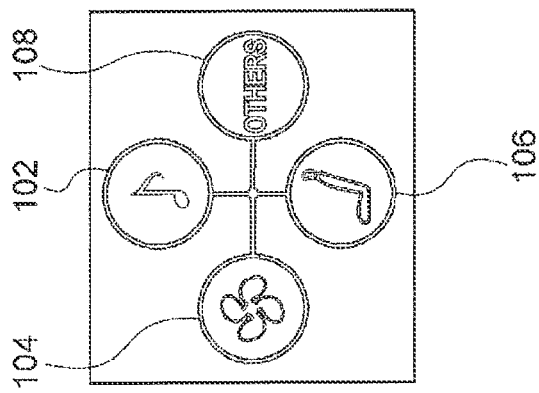
FIG. 3C is a front view of a third-tier screen as a display example of the head-up display in the first embodiment, which is displayed when other operation is determined on the second-tier screen.

FIG. 3C shows a third-tier menu screen. The third-tier screen is displayed when the left steering switch 24L is pressed in a condition where the icon 116 is selected through a swipe action over the left steering switch 24L.

An icon 118 for increasing the volume is displayed on the upper part of the third-tier screen, and an icon 122 for lowering the volume is displayed on the lower part of the screen. An icon 120 for muting audio is displayed on the left part of the third-tier screen. Also, the third-tier screen returns to the second-tier screen, when the left steering switch 24L is pressed in a condition where a screen central part 123 of the third-tier screen is selected.

Figure 4A:
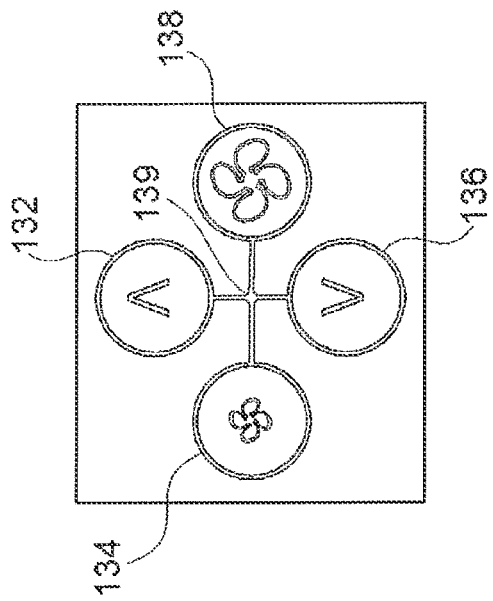
FIG. 4A is a front view of a second-tier screen as a display example of the head-up display in the first embodiment, which is displayed when operation of an air conditioner is determined on the first-tier screen of FIG. 3A.

FIG. 4A shows a second-tier menu screen that is different from that of FIG. 3B. The second-tier screen is displayed when the left steering switch 24L is pressed in a condition where the icon 104 (see FIG. 3A) is selected on the first-tier screen through a swipe action over the left steering switch 24L.

The second-tier screen is used for determining the destination of air of which the temperature has been controlled by the air conditioner 34, and an icon 126 on the upper part of the screen is provided for automatically controlling the destination of the air from the air conditioner 34. When the icon 126 is determined, the destination of the air is automatically selected so that the temperature in the vehicle cabin is kept uniform. An icon 130 on the lower part of the screen is provided for feeding the air toward the rear seat.

An icon 124 on the right part of the screen is provided for feeding the air toward the driver seat. Also, an icon 128 on the left part of the screen is provided for feeding the air toward the passenger seat. Further, the screen returns to the first-tier menu screen when the left steering switch 24L is pressed in a condition where a screen central part 131 of the second-tier screen is selected.

Figure 4B:
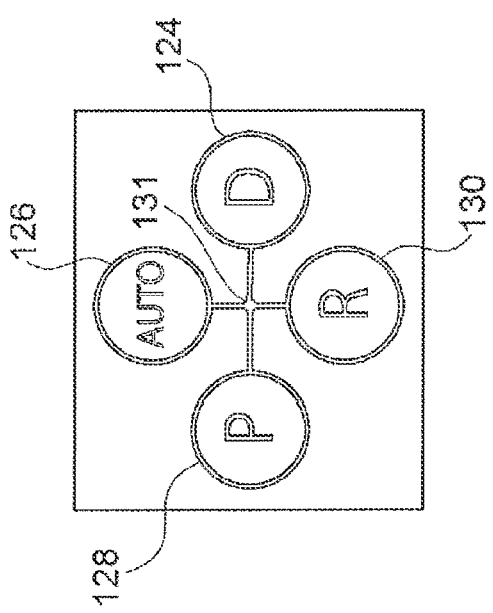
FIG. 4B is a front view of a third-tier screen as a display example of the head-up display in the first embodiment, which is displayed when operation for a driver seat is determined on the second-tier screen.

FIG. 4B shows a third-tier menu screen that is different from that of FIG. 3C. The third-tier screen is displayed when the icon 124, icon 128, or icon 130 is determined in FIG. 4A.

An icon 132 on the upper part of the third-tier screen is provided for increasing the airflow amount, i.e., the amount of air delivered from the air conditioner 34, and an icon 136 on the lower part of the screen is provided for reducing the airflow amount. Also, an icon 138 on the right part of the screen is provided for raising the set temperature of the air conditioner 34, and an icon 134 on the left part of the screen is provided for lowering the set temperature. Further, the screen returns to the second-tier menu screen when the left steering switch 24L is pressed in a condition where a screen central part 139 of the third-tier screen is selected.

Figure 5A:
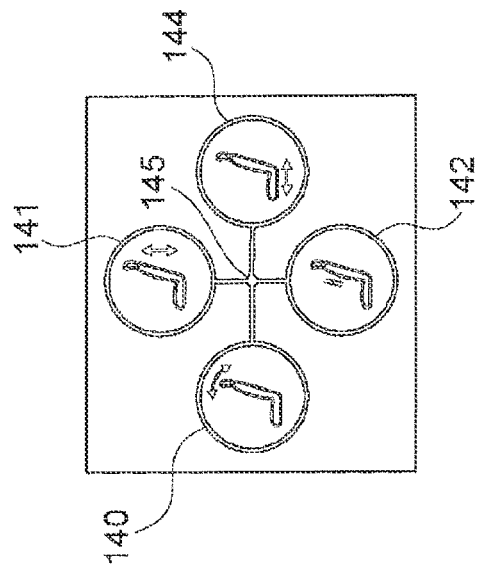
FIG. 5A is a front view of a second-tier screen as a display example of the head-up display in the first embodiment, which is displayed when operation of a seat is determined on the first-tier screen of FIG. 3A.

FIG. 5A shows a second-tier menu screen that is different from those of FIG. 3B and FIG. 4A. The second-tier screen is displayed when the left steering switch 24L is pressed in a condition where the icon 106 (see FIG. 3A) is selected on the first-tier screen through a swipe action over the left steering switch 24L.

An icon 141 on the upper part of the second-tier screen is provided for changing the level of the seat, and an icon 140 on the left part of the screen is provided for changing the reclining angle. Also, an icon 142 on the lower part of the screen is provided for implementing a massage function, and an icon 144 on the right part of the screen is provided for changing the longitudinal position of the seat. Further, the screen returns to the first-tier menu screen, when the left steering switch 24L is pressed in a condition where a screen central part 145 of the second-tier screen is selected.

Figure 5B:
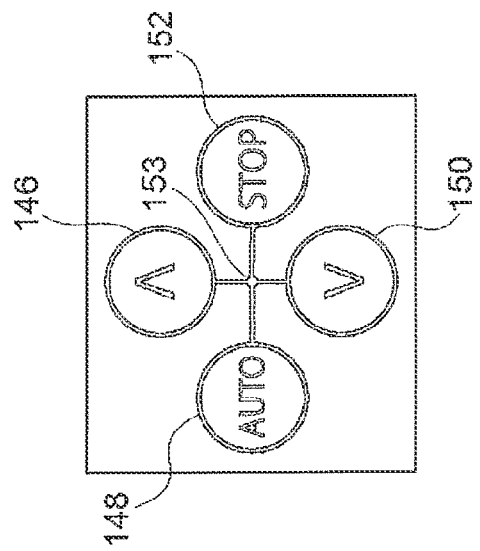
FIG. 5B is a front view of a third-tier screen as a display example of the head-up display in the first embodiment, which is displayed when massage operation is determined on the second-tier screen.

FIG. 5B shows a third-tier menu screen, which is displayed when the icon 142 is determined in FIG. 5A. An icon 146 on the upper part of the third-tier screen is provided for increasing the power of massage, and an icon 150 on the lower part of the screen is provided for reducing the power of massage.

An icon 148 on the left part of the third-tier screen is provided for automatically adjusting the power of massage, and an icon 152 on the right part of the screen is provided for stopping massage. Also, the screen returns to the second-tier menu screen, when the left steering switch 24L is pressed in a condition where a screen central part 153 of the third-tier screen is selected.

As described above, in this embodiment, a selected one of the screens of FIG. 3A to FIG. 5C is displayed on the HUD 18 when the left steering switch 24L is operated. When the right steering switch 24R is operated, information concerning the function of cruise control, for example, is displayed on the HUD 18.

Example of Vehicle-Mounted Device Operating Routine

Referring next to the flowchart of FIG. 9, one example of a vehicle-mounted device operating routine performed by the vehicle-mounted device operation system will be described. The vehicle-mounted device operating routine is executed when the ignition (power) of the vehicle 10 is turned on, for example, such that the CPU 40 reads a program from the ROM 42 or storage 46, and develops and executes the program in the RAM 44. The vehicle-mounted device operating routine is repeatedly executed at intervals of several milliseconds, for example.

Figure 9:
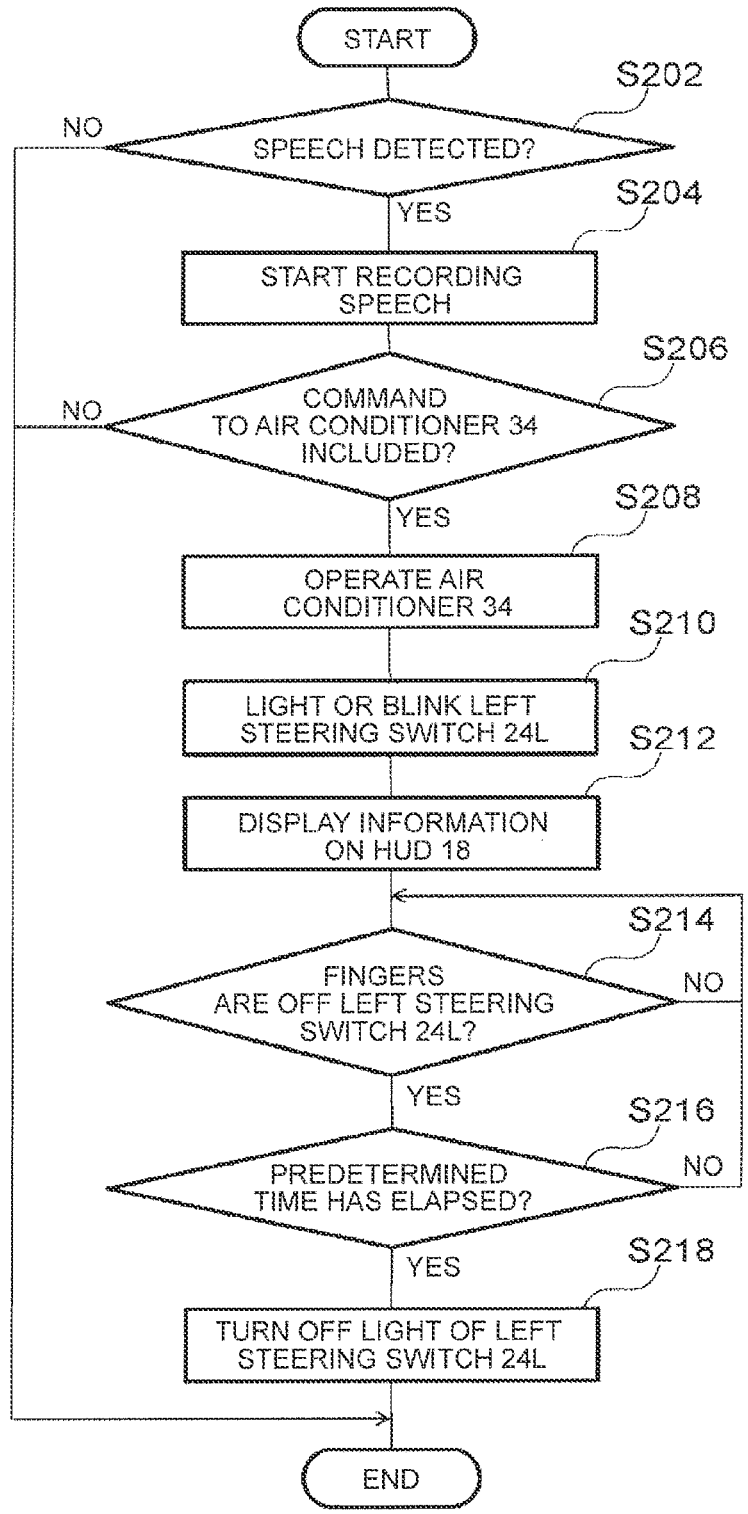
FIG. 9 is a flowchart illustrating one example of a vehicle-mounted device operating routine performed by the vehicle-mounted device operation system according to the first embodiment.

As shown in FIG. 9, the CPU 40 determines in step S202 whether speech is detected. More specifically, when speech of an occupant is collected by the microphone 26 (see FIG. 6) as the sound collector, the CPU 40 determines that speech is detected, and proceeds to step S204. When no speech of the occupant is collected by the microphone 26, the CPU 40 finishes the current cycle of the vehicle-mounted device operating routine.

The CPU 40 starts recording the speech in step S204, and determines in step S206 whether a command to any vehicle-mounted device is included in the recorded speech of the occupant, using the function of the speech determining unit 56 (see FIG. 8). In the following description, processing in the case where the air conditioner 34, as one example of vehicle-mounted device, is activated will be described. Thus, the CPU 40 determines in step S206 whether a command to the air conditioner 34 is included in the recorded speech.

When the CPU 40 determines that a command to the air conditioner 34 is included in the speech of the occupant, it proceeds to step S208. When the CPU 40 determines that no command to the air conditioner 34 is included, it finishes the current cycle of the vehicle-mounted device operating routine.

In step S208, the CPU 40 activates the air conditioner 34, using the function of the vehicle-mounted device activating unit 58 (see FIG. 8). For example, when the occupant says "It's hot", the CPU 40 activates the air conditioner 34 to cause cold air to blow into the vehicle cabin, so as to lower the temperature in the cabin. Also, when the occupant says "It's cold", the CPU 40 activates the air conditioner 34 to cause warm air to blow into the vehicle cabin, so as to raise the temperature in the cabin. Further, when the occupant says "Turn on the air conditioner," the CPU 40 activates the air conditioner 34 to cause air having a temperature controlled to a preset temperature, to blow into the vehicle cabin.

In step S210, the CPU 40 lights or blinks the left steering switch 24L, using the function of the highlighting unit 60 (see FIG. 8). In this embodiment, as one example, the left steering switch 24L is lighted, as shown in FIG. 2. At this time, the brightness and light source of illumination for lighting the left steering switch 24L are controlled or selected according to the illuminance of the surroundings of the vehicle 10 measured by the illuminance sensor 38 (see FIG. 6), by use of the functions of the brightness changing unit 62 and the light-source selecting unit 64 (see FIG. 8).

As shown in FIG. 9, the CPU 40 displays information on the HUD 18 (see FIG. 2) in step S212. More specifically, as shown in FIG. 4B, the third-tier menu screen is displayed. Namely, the CPU 40 displays information that enables manual operation of the air conditioner 34, on the HUD 18, so that the airflow amount and set temperature of the air conditioner 34 can be changed.

As shown in FIG. 9, the CPU 40 determines in step S214 whether the fingers of the occupant are off the left steering switch 24L, namely, whether the fingers are not in touch with the left steering switch 24L. The left steering switch 24L includes a capacitive sensor; therefore, when there is no change in capacitance, the CPU 40 determines that the fingers of the occupant are off the left steering switch 24L, and proceeds to step S216.

On the other hand, when any finger is in touch with the left steering switch 24L, the CPU 40 determines that the occupant is operating the left steering switch 24L, and repeatedly executes step S214 until the finger of the occupant moves away from the left steering switch 24L.

The CPU 40 determines in step S216 whether a predetermined time has elapsed. When the predetermined time elapses in a condition where the fingers are off the left steering switch 24L, the CPU 40 proceeds to step S218.

In step S218, the CPU 40 turns off the light of the left steering switch 24L. Namely, when the predetermined time elapses without having the left steering switch 24L operated, the CPU 40 returns the system to a condition before the left steering switch 24L is highlighted. Then, the CPU 40 finishes the vehicle-mounted device operating routine.

Functions

Next, the functions of this embodiment will be described.

As shown in FIG. 8, the vehicle-mounted device operation system of this embodiment includes the vehicle-mounted device activating unit 58. When the speech determining unit 56 determines that a command to a certain vehicle-mounted device is included in the speech, the vehicle-mounted device activating unit 58 activates the vehicle-mounted device. This makes it possible to activate the vehicle-mounted device without requiring the occupant to perform manual operation via the operating part, such as the steering switches 24.

The vehicle-mounted device operation system also includes the highlighting unit 60, and the highlighting unit 60 highlights the operating part (in this embodiment, the left steering switch 24L) for manually operating the vehicle-mounted device activated by the vehicle-mounted device activating unit 58. This makes it possible to save the occupant the trouble of finding the position of the operating part with which the occupant operates the vehicle-mounted device. Namely, after activating the vehicle-mounted device using the speech recognition function, it is possible to change conditions of the vehicle-mounted device by subsequent manual operation. For example, when the occupant says "It's hot," the vehicle-mounted device activating unit 58 functions to activate the air conditioner 34 to deliver cold air into the vehicle cabin, so as to lower the temperature in the cabin, and the highlighting unit 60 functions to light the left steering switch 24L. As a result, the occupant intuitively understands that he/she is merely required to operate the left steering switch 24L that is being lighted, when he/she wishes to further lower the set temperature. Thus, the operability of the vehicle-mounted device can be improved.

Further, in this embodiment, as shown in FIG. 1, the right steering switch 24R and left steering switch 24L provided on the steering wheel 16 serve as operating parts. With this arrangement, when the driver activates or operates the vehicle-mounted device through manual operation, he/she does not need to release the hand from the steering wheel 16.

Furthermore, in this embodiment, highlighting is performed by lighting the left steering switch 24L. Thus, the occupant can intuitively recognize the position of the operating part for the vehicle-mounted device.

Also, in this embodiment, the brightness changing unit 62 as shown in FIG. 8 functions to lower the brightness of the left steering switch 24L at the time of lighting as the illuminance level of the surroundings of the vehicle 10 is lower. On the other hand, the brightness of the left steering switch 24L is increased as the illuminance level of the surroundings of the vehicle 10 is higher. Thus, the comfortability can be improved, as compared with the case where the left steering switch 24L is lighted or blinked with a fixed brightness level. Namely, the occupant is less likely or unlikely to feel that the operating part is too bright when the vehicle 10 is placed in dark surroundings. Also, it is less likely or unlikely to be difficult for the occupant to recognize the position of the operating part that is being lighted or blinked when the vehicle 10 is placed in bright surroundings. In particular, the operating part, such as the steering switches 24, is located closer to the driver, than the operation panel 22; thus, the comfortability can be further improved by suitably adjusting the brightness.

When the light source of illumination is selected in accordance with the illuminance of the surroundings of the vehicle 10, by use of the function of the light-source selecting unit 64, substantially the same effect as that provided when the brightness is changed can be obtained. Namely, the left steering switch 24L is lighted with a light source that emits light having a dark color when the vehicle 10 is placed in dark surroundings, and the left steering switch 24L is lighted with a light source that emits light having a bright color when the vehicle 10 is placed in bright surroundings, so that the comfortability can be improved.

Further, in this embodiment, as shown in the flowchart of FIG. 9, when the predetermined time elapses without having the left steering switch 24L operated, in a condition where the left steering switch 24L is being lighted, the illumination of the left steering switch 24L is turned off. It is thus possible to cancel or terminate the highlighted condition without requiring the occupant to perform any special operation.

Further, in this embodiment, information on the activated vehicle-mounted device is displayed on the HUD 18, so that the driver can visually confirm that the vehicle-mounted device has been activated. Also, the third-tier information that permits manual operation of the air conditioner 34 is displayed, so that the driver can continue to perform manual operation while viewing the HUD 18.

In the vehicle-mounted device operating routine of this embodiment, the vehicle-mounted device, such as the air conditioner 34, is activated by use of the function of the vehicle-mounted device activating unit 58, and the operating part is highlighted. However, the disclosure is not limited to this mode of operation. For example, a vehicle-mounted device operating routine as shown in the flowchart of FIG. 10 may be performed.

Modified Example

Figure 10:
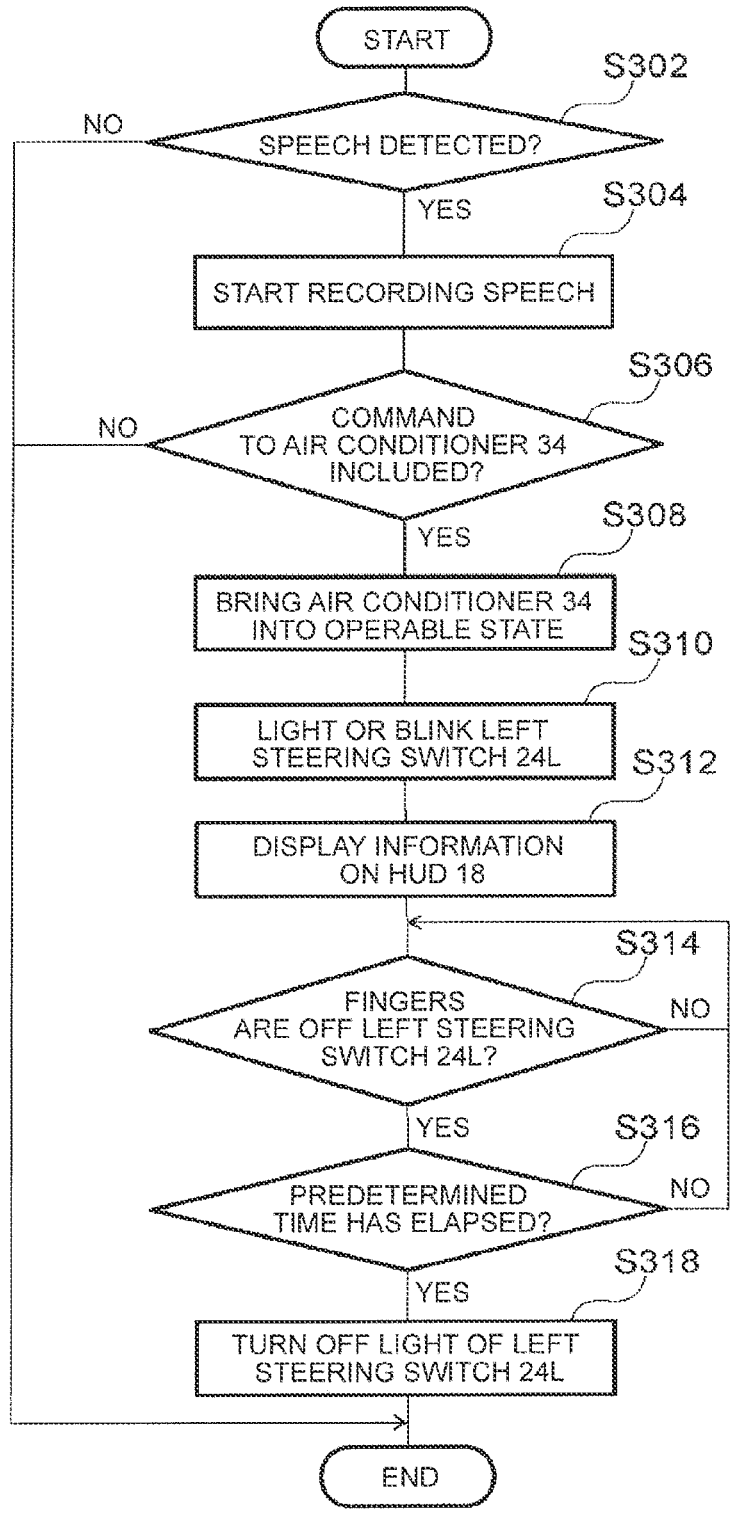
FIG. 10 is a flowchart illustrating another example of the vehicle-mounted device operating routine performed by the vehicle-mounted device operation system according to the first embodiment.

As shown in FIG. 10, in step S302 to step S306, substantially the same tasks as those of step S202 to step S206 of FIG. 9 are performed. Namely, the CPU 40 determines in step S302 whether speech is detected, and starts recording speech in step S304 when speech is detected. Also, the CPU 40 determines in step S306 whether a command to any vehicle-mounted device is included in the recorded speech of the occupant. In the following description, processing in the case where the air conditioner 34, as one example of vehicle-mounted device, is activated will be described. Thus, the CPU 40 determines in step S306 whether a command to the air conditioner 34 is included in the recorded speech.

When the CPU 40 determines in step S306 that a command to the air conditioner 34 is included, it proceeds to step S308 to bring the air conditioner 34 into an operable state. In step S310, the CPU 40 lights the left steering switch 24L, as shown in FIG. 2, using the function of the highlighting unit 60 (see FIG. 8).

Further, the CPU 40 displays information on the HUD 18 in step S312. More specifically, as shown in FIG. 4B, the third-tier menu screen is displayed. Namely, in the vehicle-mounted device operating routine according to the modified example, the CPU 40 lights the left steering switch 24L after placing the air conditioner 34 in an operable state, and further displays conditions of the air conditioner 34 on the HUD 18. The "operable state" mentioned herein means a state in which the occupant can activate the vehicle-mounted device by one action. For example, when the occupant activates the air conditioner 34 via manual operation, to change the temperature of air delivered to the driver seat, it is necessary to determine the air-conditioner icon 104 from the first-tier menu screen shown in FIG. 3A, and then determine the icon 124 from the second-tier menu screen shown in FIG. 4A. On the other hand, in this modified example, step S308 to step S312 are executed, so that the driver can change the temperature, merely by manually operating and pressing the left steering switch 24L that is being lighted.

The tasks of step S314 and subsequent steps are substantially identical with those of step S214 and subsequent steps in FIG. 9. Namely, the CPU 40 determines in step S314 whether the fingers of the occupant are off the left steering switch 24L. When the fingers are off the left steering switch 24L, the CPU 40 determines in step S316 whether a predetermined time has elapsed. Then, when the predetermined time elapses in a condition where the fingers are off the left steering switch 24L, the CPU 40 proceeds to step S318, to turn off the illumination of the left steering switch 24L.

As described above, in the vehicle-mounted device operating routine according to the modified example, the air conditioner 34 (vehicle-mounted device) is not activated by use of the speech recognition function, but the air conditioner 34 (vehicle-mounted device) is brought into the operable state. Thus, the occupant is prompted to perform manual operation on the air conditioner 34, so that the air conditioner 34 can be prevented from being activated on its own, as in the case where the occupant wishes to control the temperature in the vehicle cabin by opening a window, for example. Also, the audio device 32 can be prevented from being erroneously activated when the occupant utters such a word as "music" in a conversation, for example. In FIG. 10, step S308, step S310, and step S312 are executed almost at the same time; thus, the order of these steps may be changed.

Second Embodiment

Referring next to FIG. 11 to FIG. 14, a vehicle-mounted device operation system according to a second embodiment will be described. In these drawings, the same reference numerals are assigned to the same or corresponding components as those of the first embodiment, and these components will not be further described.

Figure 11:
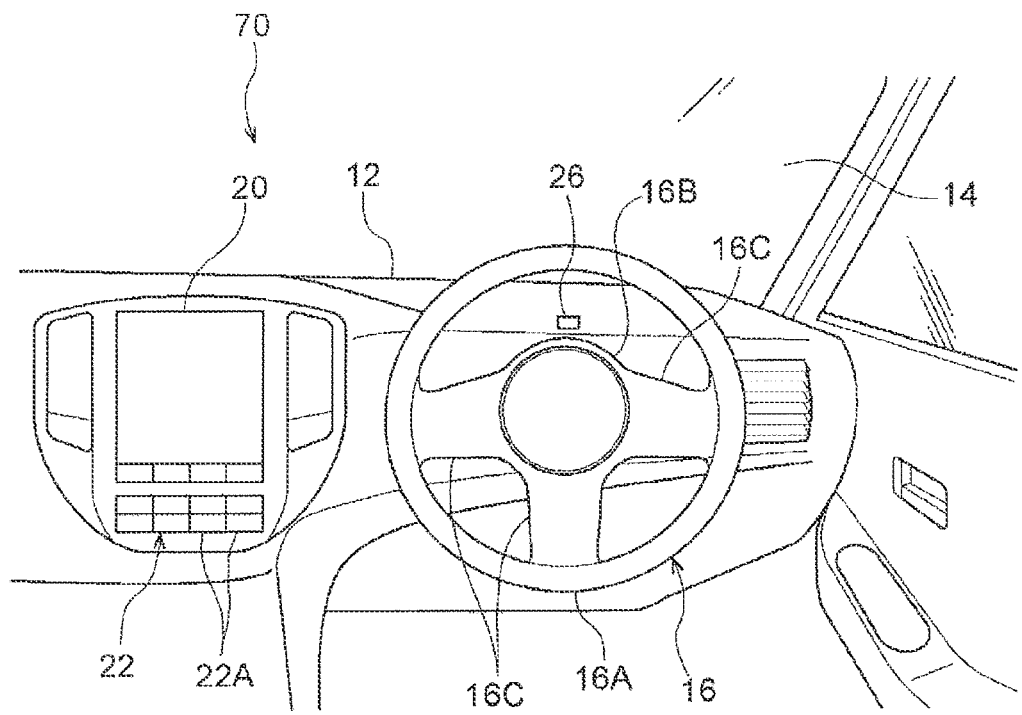
FIG. 11 is an appearance diagram illustrating a front part of a vehicle cabin of a vehicle using a vehicle-mounted device operation system according to a second embodiment, when viewed from the vehicle rear side.

As shown in FIG. 11, the steering wheel 16 is provided, via a steering column (not shown), on the driver seat side (the vehicle right-hand side) of the instrument panel 12 of a vehicle 70 using the vehicle-mounted device operation system of this embodiment. The steering wheel 16 includes the rim 16A, hub 16B, and two or more (three in this embodiment) spokes 16C.

In this embodiment, no operating part is provided on the steering wheel 16. Namely, the right steering switch 24R and left steering switch 24L of the first embodiment are not provided. Also, in this embodiment, no display is provided on the windshield glass 14. Namely, the HUD 18 of the first embodiment is not provided. The other configuration is substantially identical with that of the first embodiment.

Figure 13:
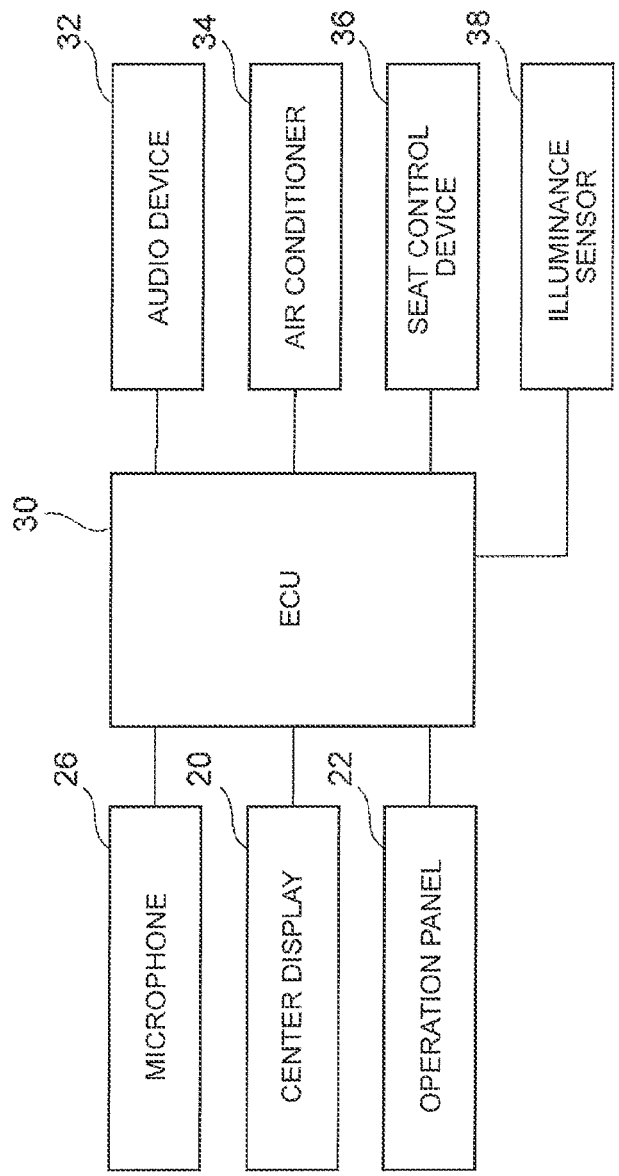
FIG. 13 is a block diagram showing the hardware configuration of the vehicle-mounted device operation system according to the second embodiment.

As shown in FIG. 13, the vehicle-mounted device operation system includes the ECU 30 as the controller. The ECU 30 is electrically connected to the microphone 26, center display 20, operation panel 22, audio device 32, air conditioner 34, seat control device 36, and illuminance sensor 38. The hardware configuration of the ECU 30 is substantially identical with that shown in the block diagram of FIG. 7.

Example of Vehicle-Mounted Device Operating Routine

Next, one example of a vehicle-mounted device operating routine performed by the vehicle-mounted device operation system will be described with reference to the flowchart of FIG. 14. The vehicle-mounted device operating routine is executed when the ignition (power) of the vehicle 70 is turned on, for example, such that the CPU 40 reads a program from the ROM 42 or storage 46, and develops and executes the program in the RAM 44. The vehicle-mounted device operating routine is repeatedly executed at intervals of several milliseconds, for example.

As shown in FIG. 14, the CPU 40 determines in step S402 whether speech is detected. More specifically, when speech of an occupant is collected by the microphone 26 (see FIG. 6) as the sound collector, the CPU 40 determines that speech is detected, and proceeds to step S404. When no speech is collected by the microphone 26, the CPU 40 finishes the current cycle of the vehicle-mounted device operating routine.

The CPU 40 starts recording speech in step S404, and determines in step S406 whether a command to any vehicle-mounted device is included in the recorded speech of the occupant, using the function of the speech determining unit 56 (see FIG. 8). Here, processing in the case where the air conditioner 34, as one example of vehicle-mounted device, is activated will be described. Thus, the CPU 40 determines in step S406 whether a command to the air conditioner 34 is included in the speech.

When the CPU 40 determines from the speech of the occupant that a command to the air conditioner 34 is included in the speech, it proceeds to step S408. When the CPU 40 determines that no command to the air conditioner 34 is included, it finishes the current cycle of the vehicle-mounted device operating routine.

Figure 12:
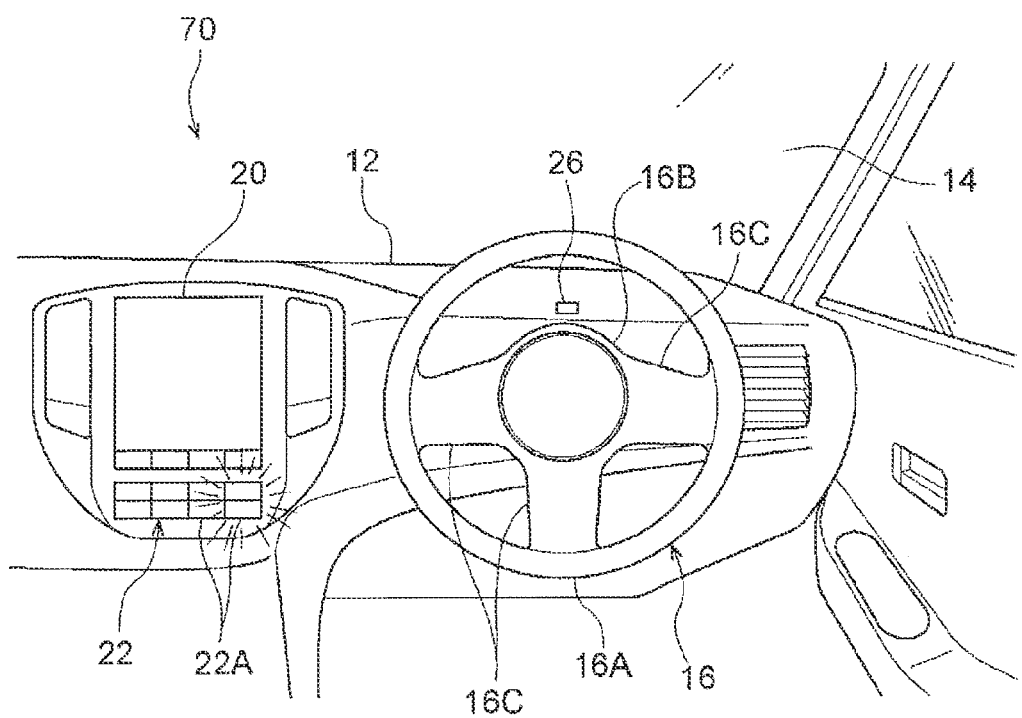
FIG. 12 is an appearance diagram corresponding to FIG. 11, showing a condition in which operation buttons are lighted, from the condition of FIG. 11.

The CPU 40 activates the air conditioner 34 in step S408, using the function of the vehicle-mounted device activating unit 58 (see FIG. 8). Also, the CPU 40 lights or blinks the operation panel 22 in step S410, using the function of the highlighting unit 60 (see FIG. 8). As shown in FIG. 12, in this embodiment, upper and lower operation buttons 22A located at the right end of the operation panel 22 are lighted, as one example. At this time, the brightness and light source of illumination for lighting the operation buttons 22A are changed according to the illuminance of the surroundings of the vehicle 70 measured by the illuminance sensor 38 (see FIG. 6), by use of the functions of the brightness changing unit 62 and light-source selecting unit 64 (FIG. 8). The operation buttons 22A that are being lighted are used for manually operating the air conditioner 34.

As shown in FIG. 14, the CPU 40 displays information on the center display 20 (see FIG. 12) in step S412. While description about a display screen is not provided, a screen having the same content as the third-tier menu screen shown in FIG. 4B is displayed. Namely, the CPU 40 displays conditions of the air conditioner 34 on the center display 20, and allows the airflow amount and set temperature of the air conditioner 34 to be changed.

As shown in FIG. 14, the CPU 40 determines in step S414 whether the fingers of the occupant are off the operation panel 22. When the fingers of the occupant are off the operation panel 22, the CPU 40 proceeds to step S416.

On the other hand, when any finger is in touch with the operation panel 22, namely, when any of the operation buttons 22A is operated, the CPU 40 repeatedly executes step S414 until the operation button 22A finishes being operated.

The CPU 40 determines in step S416 whether a predetermined time has elapsed. Then, when the predetermined time elapses in a condition where the fingers are off the operation panel 22 (operation buttons 22A), the CPU 40 proceeds to step S418.

In step S418, the CPU 40 turns off the light of the operation buttons 22A. Namely, when the predetermined time elapses without having the operation buttons 22A operated, the CPU 40 returns the system to a condition before the operation buttons 22A are highlighted. Then, the CPU 40 finishes the vehicle-mounted device operating routine.

Functions

Next, the functions of this embodiment will be described.

With the vehicle-mounted device operation system according to this embodiment, the operability of the vehicle-mounted devices can be improved, even in the vehicle that is not equipped with the HUD and steering switches. The other functions are identical with or similar to those of the first embodiment.

While the embodiments have been described, the disclosure may be embodied in various other forms, without departing from the principle of the disclosure. For example, while the microphone 26 as the sound collector is provided in front of the driver seat, as shown in FIG. 1, the position and number of the microphone(s) 26 are not limited. Two or more microphones may be provided at the ceiling of the vehicle cabin, and may be configured to collect speech made by all occupants in the vehicle cabin.

While the vehicle-mounted device operating routine has been described with respect to the case where the air conditioner 34 is activated as the vehicle-mounted device, this routine may also be applied to the case where other vehicle-mounted devices, such as the audio device 32 and the seat control device 36, are activated. For example, when the audio device 32 is activated as the vehicle-mounted device, the CPU 40 determines in step S206 of FIG. 9 whether a command to the audio device 32 is included in speech. When the occupant says "Play music," the CPU 40 activates the audio device 32, so as to play music in the vehicle cabin. Also, when the occupant says "Lower the volume," in a condition where music is being played, the CPU 40 may activate the audio device 32 so as to lower the volume. Further, in step S212, the CPU 40 may display the third-tier menu screen shown in FIG. 3C, on the HUD 18. In this manner, the occupant can change the volume, without performing manual operation on the first-tier and second-tier screens.

While the left steering switch 24L as the operating part is lighted in the illustrated embodiment, the disclosure is not limited to this case. For example, when the right steering switch 24R serves as the operating part, the right steering switch 24R is lighted. Also, the right steering switch 24R and the left steering switch 24L may be blinked.

Further, in the illustrated embodiment, the operation buttons 22A are lighted or blinked with the same color, as shown in FIG. 12. However, the disclosure is not limited to this arrangement. For example, the upper operation button 22A, as one of the upper and lower operation buttons 22A that are lighted or blinked, may be lighted with red color, and the lower operation button 22A may be lighted with blue color. In this manner, even in the case where the driver is located at a distance from the operation buttons 22A, the driver can intuitively distinguish the button for raising the set temperature, from the button for lowering the set temperature, for example.

While the operation button 22A serves as the operating part in FIG. 12, the operating part is not limited to this type. In a structure using a dial-type operating part, the dial-type operating part may be lighted or blinked. Further, in a structure including a touch-panel type center display, a portion representing a button displayed on the center display may be lighted or blinked.

In the illustrated embodiments, highlighting is performed by lighting or blinking the operating part; however, the manner of highlighting is not limited to this. For example, in a vehicle having an initial condition where the operating part as a whole is lighted so as to improve the design quality of the vehicle interior, the light of the operating part may be turned off except for particular button(s) or switch(es), by use of the function of the highlighting unit. In this case, only the operating part for permitting manual operation of the vehicle-mounted device is kept in a lighted or illuminated state, so that the occupant can be informed of the position of the operating part. Also, only the particular button(s) or switch(es) may be blinked, or only the particular button(s) or switch(es) may be lighted with another color, so as to provide substantially the same effect.

The routine in which the air conditioner 34 is activated by use of the function of the vehicle-mounted device activating unit 58 has been described with reference to the flowchart of FIG. 9, and the routine in which the air conditioner 34 is brought into the operable state by use of the function of the vehicle-mounted device activating unit 58 has been described with reference to the flowchart of FIG. 10. However, these routines may be combined together. In this case, in step S206 of FIG. 9, the CPU 40 may determine whether the content of the speech delivered by the occupant is a command to operate the air conditioner 34, or a command to bring the air conditioner 34 into the operable state. Then, when the content of the speech delivered by the occupant is a command to operate the air conditioner 34, the CPU 40 proceeds to step S208, to operate the air conditioner 34. This corresponds to the case where the occupant says "It's hot," or "It's cold," for example.

On the other hand, when the content of the speech delivered by the occupant is a command to bring the air conditioner 34 into the operable state, the CPU 40 proceeds to step S308 (see FIG. 10), to bring the air conditioner 34 into the operable state. This corresponds to the case where the occupant utters words "Air conditioner", for example.

While the HUD 18 of the illustrated embodiment is configured to project an image onto the windshield glass 14, it is not limited to this configuration. For example, a combiner may be provided on the instrument panel, and an image may be projected onto the combiner.

In this specification, the concept of "activation" is not limited to the operation to activate the vehicle-mounted device that has not been activated, but includes operation to change a condition of the vehicle-mounted device that is in operation.

What is claimed is:

1. An operation control device mounted in a vehicle, comprising:
   at least one processor configured to:
      collect speech of an occupant;
      activate a vehicle-mounted device based on a content of the speech; and display, on a display, manually operable information to change conditions of the vehicle-mounted device after the at least one processor activates the vehicle-mounted device,
wherein the display is located in a range in which the display is visually recognizable by a driver, and the at least one processor is further configured to display information about the vehicle-mounted device on the display when the vehicle-mounted device is activated by the at least one processor, and
wherein the information about the vehicle-mounted device is displayed on the display in a hierarchical way, and the at least one processor is further configured to display the information in a hierarchical order that permits manual operation of the vehicle-mounted device, on the display, when the vehicle-mounted device is activated by the at least one processor.

2. The operation control device according to claim 1, wherein the at least one processor is further configured to:
determine whether a command to the vehicle-mounted device is included in the content of the speech of the occupant; and
when the command is included in the content of the speech, activate the vehicle-mounted device according to the command.

3. The operation control device according to claim 2, wherein the at least one processor is further configured to:
highlight a part of a plurality of steering switches for the vehicle-mounted device activated by the at least one processor,
wherein the plurality of steering switches are located on a steering wheel, and are configured to be subjected to operation for manually operating the vehicle-mounted device.

4. The operation control device according to claim 3, wherein the at least one processor is further configured to:
highlight the plurality of steering switches by lighting or blinking the plurality of steering switches.

5. The operation control device according to claim 4, wherein the at least one processor is further configured to:
reduce brightness of the plurality of steering switches at a time of lighting or blinking as illuminance of surroundings of the vehicle is lower; and
increase the brightness as the illuminance of the surroundings of the vehicle is higher.

6. The operation control device according to claim 3, wherein the at least one processor is further configured to:
when a predetermined time elapses without having the plurality of steering switches manually operated, after the plurality of steering switches are highlighted, return the plurality of steering switches to a condition before the plurality of steering switches are highlighted.

7. The operation control device according to claim 1, wherein the at least one processor is further configured to:
display information on a hierarchy that is not the highest hierarchy among the information in a hierarchical order that permits manual operation of the vehicle-mounted device, on the display, when the vehicle-mounted device is activated by the at least one processor.

8. The operation control device according to claim 1, wherein the vehicle-mounted device that is activated based on the content of the speech is decided based on a particular word included in the speech, the particular word being different from a specific name of the vehicle-mounted device.

9. The operation control device according to claim 3, wherein the at least one processor is further configured to:
determine whether fingers of the occupant are off the display; and
in response to determining that the fingers of the occupant are off the display for a predetermined time, turn off the highlighted steering switches.

10. A method of operating a vehicle-mounted device mounted in a vehicle, comprising:
collecting speech of an occupant;
activating a vehicle-mounted device based on a content of the speech;
displaying, on a display, manually operable information to change conditions of the vehicle-mounted device after activating the vehicle-mounted device;
displaying information about the vehicle-mounted device on the display when the vehicle-mounted device is activated; and
displaying the information in a hierarchical order that permits manual operation of the vehicle-mounted device, on the display, when the vehicle-mounted device is activated.

11. The method according to claim 10, further comprising:
determining whether a command to the vehicle-mounted device is included in the content of the speech of the occupant; and
when the command is included in the content of the speech, activating the vehicle-mounted device according to the command.

12. The method according to claim 11, further comprising:
highlighting a part of a plurality of steering switches for the vehicle-mounted device activated by a processor,
wherein the plurality of steering switches are located on a steering wheel, and are configured to be subjected to operation for manually operating the vehicle-mounted device.

13. The method according to claim 12, further comprising:
highlighting the plurality of steering switches by lighting or blinking the plurality of steering switches.

14. The method according to claim 13, further comprising:
reducing brightness of the plurality of steering switches at a time of lighting or blinking as illuminance of surroundings of the vehicle is lower; and
increasing the brightness as the illuminance of the surroundings of the vehicle is higher.

15. The method according to claim 12, further comprising:
when a predetermined time elapses without having the plurality of steering switches manually operated, after the plurality of steering switches are highlighted, returning the plurality of steering switches to a condition before the plurality of steering switches are highlighted.

16. A non-transitory computer-readable medium storing instructions that, when executed by at least one processor of an operation control device mounted in a vehicle, cause the operation control device to:
collect speech of an occupant;
activate a vehicle-mounted device based on a content of the speech;
display, on a display, manually operable information to change conditions of the vehicle-mounted device after the operation control device activates the vehicle-mounted device;

display information about the vehicle-mounted device on the display when the vehicle-mounted device is activated; and display the information in a hierarchical order that permits manual operation of the vehicle-mounted device, on the display, when the vehicle-mounted device is activated.

17. The non-transitory computer-readable medium according to claim 16, wherein the instructions further cause the operation control device to:

determine whether a command to the vehicle-mounted device is included in the content of the speech of the occupant; and when the command is included in the content of the speech, activate the vehicle-mounted device according to the command.

* * * * *